Feb. 26, 1963     D. M. BROWN ET AL     3,078,928
FURROW FILLER
Filed Sept. 16, 1960
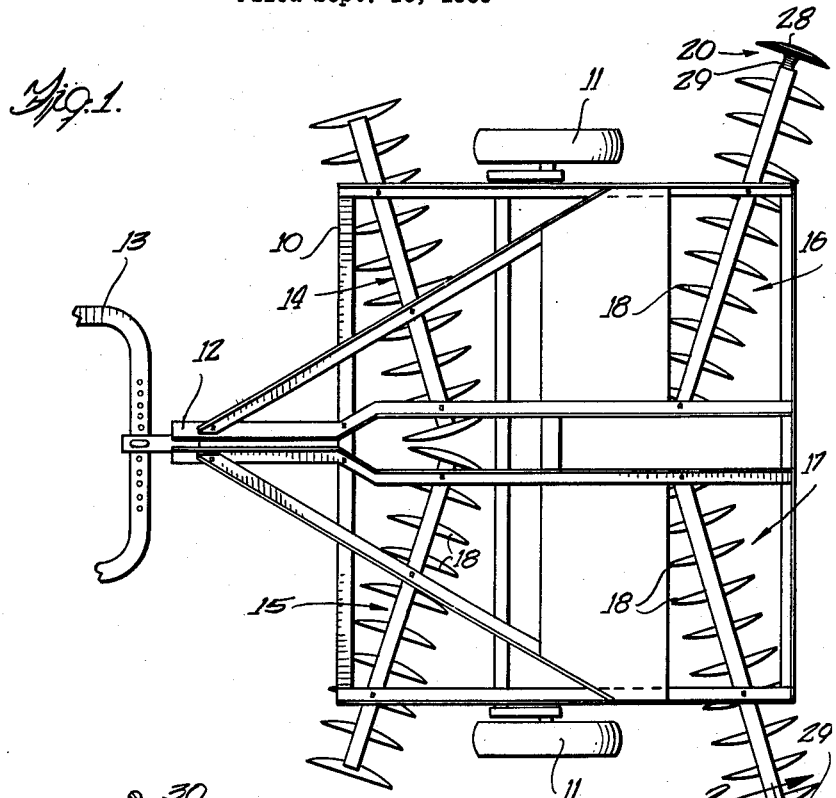
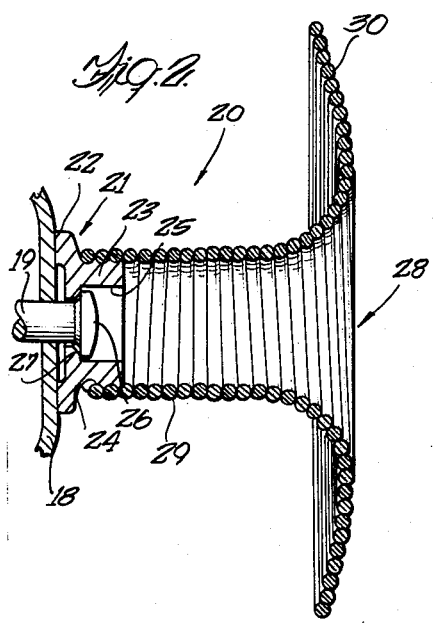
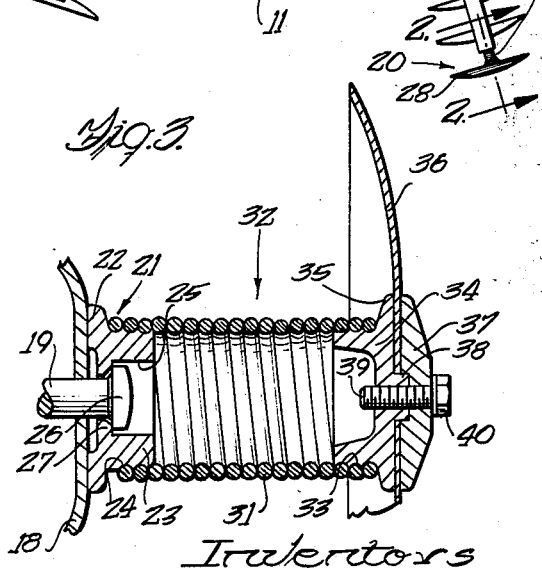
Inventors
Daniel M. Brown
Robert D. Woodworth
Paul O. Pippel
Attorney United States Patent Office 3,078,928
Patented Feb. 26, 1963

3,078,928
FURROW FILLER
Daniel M. Brown, Villa Park, and Robert D. Woodworth, Downers Grove, Ill., assignors to International Harvester Company, Chicago, Ill., a corporation of New Jersey
Filed Sept. 16, 1960, Ser. No. 56,587
6 Claims. (Cl. 172—142)

This invention relates to agricultural implements and particularly to disk harrows. More specifically, the invention concerns a novel furrow filler for a disk harrow.

In conventional disk harrows wherein the gangs are arranged diagonally in tandem relation and propelled by a tractor or the like, the concave faces of the disks of the front gang are directed to and throw the dirt to one side of the path of travel while the concave faces of the disks of the rear gang are directed to and throw the dirt to the other side of the path of travel. In such a harrow the outermost disk of the rear gang or gangs, throws up a wall of earth and forms a deep furrow which is not filled in subsequent passes over the field, and numerous such furrows occur in a large field to be treated.

This condition is undesirable for reasons including the channeling of water and erosion of the soil, and the present invention contemplates as its object the provision of a disk harrow having means for avoiding this objectionable feature.

Another object of the invention is a provision of a disk harrow having means secured to the outer end of the rear gang for leveling the wall of earth and filling the furrow formed by the outermost disk of the gang.

Another object of the invention is the provision of a simple and flexible, yet inexpensive and efficient attachment for a disk harrow adapted to permit the use of the harrow in the conventional way without leaving walls of earth and furrows in the field after it is tilled.

Furrow filling attachments for disk harrows are old, as for example in the patent to Iseley 1,616,576, and the conventional attachment comprises a disk of smaller diameter than the harrow disks, spaced from the end disks of the gang and connected thereto by rigid spacer means similar to the spacers between the regular disks. The result is that the furrow filling disk participates in any up-and-down action of the harrow gang to which it is attached, and conversely the harrow gang participates in whatever forces affect the filler disk. In other words, deflection of the filler disk by passage thereof over hard lumps, rocks, etc., is transmitted to the harrow gang, so that, for example, when the filler disk moves upwardly it takes the gang with it, interfering with the uniform operation of the gang and frequently damaging the filler disk.

Therefore a further object of the invention is the provision of a flexible furrow filling attachment for the outer end of a disk harrow adapted to yield radially or in a vertical plane to minimize the effect of the action of the furrow filler on the other disks of the gang and to avoid damage thereto.

Other objects and advantages of the invention will become clear from the following detailed description when read in conjunction with the accompanying drawings wherein:

FIGURE 1 is a plan view of a tandem disk harrow incorporating the features of this invention;

FIGURE 2 is an enlarged section taken on the line 2—2 of FIGURE 1; and

FIGURE 3 is a sectional view similar to that of FIGURE 2, illustrating a modified form of the invention.

The disk harrow of FIGURE 1 comprises a generally rectangular frame 10 supported by laterally spaced wheels 11 and having a forwardly extending hitch structure 12 adapted for attachment to the drawbar 13 of a tractor, not shown.

A pair of forwardly diverging disk gangs 14 and 15 are mounted on the forward portion of the harrow frame and forwardly converging disk gangs 16 and 17 are mounted on the frame in tandem behind the front gangs. Each of the gangs 14, 15, 16 and 17 is provided with a plurality of spaced disks 18, all of substantially the same diameter, and the concave faces of the disks of the forward gangs are directed forwardly and outwardly, while the concave faces of the disks of the rear gangs are directed inwardly.

It may be understood that the disks 18 of each of the rear gangs 16 and 17 is mounted in a manner well known in the art, and forming no part of this invention, upon an elongated bolt or shaft 19, indicated in FIGURES 2 and 3, and it will be observed that the outermost disk 18 of each of the rear gangs extends laterally outwardly beyond the outermost disk of the associated front gang.

It may be understood that the rear gangs 16 and 17 are substantial duplicates, and that a furrow filling attachment 20 is secured to the outer end thereof. A supporting block 21 is provided at the outer end of each gang and this block comprises a flange section 22 bearing against the outer face of the outermost disk 18 and a reduced section 23 having grooves 24 formed therein. Support block 21 is provided with a central bore 25 adapted to receive the enlarged head 26 of bolt 19 and a shoulder portion 27 adapted to engage the under side of the head 26.

It may be understood that bolt 19 extends through the complete length of the disk gang through openings provided in the disks, and the latter are mounted on the bolt 19 by conventional means, not shown, well known in the art. Such means includes means for tightening the bolt head 26 against the shoulder 27 to hold the supporting block 21 tightly against the outer face of the outermost disk 18 of the gang.

A disk-like, flexible earth-engaging member or element 28 is mounted at the outer end of each rear gang for removable attachment to the supporting block 21 and comprises a cylindrical coil spring section 29 extending horizontally from and coaxial with the outer end of the gange with the inner coils thereof received in grooves 24 of the supporting block 21. Coil spring 29 is flared outwardly as shown in FIGURE 2 into coils of increasing diameter to form a disk-shaped section 30, which is of smaller diameter than that of a disk 18 of the gang and is engageable with the wall of earth dug by the outermost disk 18 to break down the wall of earth and move it into the furrow formed by the outermost disk 18 to level off the ground.

The resiliency and shape of the earth-engaging member 28 is adapted particularly well to the leveling of the wall of earth and its inherent flexibility permits it to yield in a vertical plane in response to ground forces acting upon it.

FIGURE 3 is a view similar to FIGURE 2 of a modified form of the present invention wherein like numbers designate like ports, and wherein the furrow filling attachment includes an elongated cylindrical coil spring 31 the inner coils of which are received in the grooves 24 of the supporting block 21. Coil spring 31 projects axially from the outer end of the disk gang and forms part of a furrow filling attachment designated generally by the numeral 32. The coils at the outer end of the cylindrical spring 31 are received in grooves 33 formed in a plate 34 having flange 35 bearing against the concave inner face of a disk 36, the diameter of which is less than that of the gang disks 18. This lesser diameter of the disk 36 disposes it ideally for the purpose intended, to engage and level the wall of earth dug by the outermost disk 18 of the gang, and to move the dirt into the furrow formed by the outermost disk.

Another plate 37 engages the outer face of disk 36 and is recessed to receive an axial projection 38 on the plate 35 which passes through an opening in the center of the disk 36, and both plates 35 and 37 are centrally bored and threaded to receive a threaded bolt 39, the outer end of which has a head 40 adapted to engage the outer face of plate 37 to hold the parts together.

The disk 36, like the disk-like member 30, engages the wall of earth dug by the outermost disk of the gang and the entire unit is adapted to yield radially due to the pressure of the soil thereagainst when obstructions and the like are encountered.

It is believed that the construction and operation of the novel furrow filling apparatus of this invention will be clearly understood from the foregoing description. It should likewise be understood that the invention has been described in its preferred embodiments only, and that modifications may be made therein without departing from the spirit of the invention or the scope of the appended claims.

What is claimed is:

1. In a disk harrow including a gang of disks in axial alignment, an attachment for leveling the wall of earth dug by the outermost disk of the gang, comprising a supporting member secured to one end of the gang adjacent the outer face of the outermost disk and coaxial therewith, and a flexible earth-engaging member anchored at one end to said supporting member and extending axially therefrom and adapted to aggressively engage said wall of earth, said flexible member having sufficient rigidity to level said wall of earth but yieldable in response to pressure of the soil thereagainst.

2. In a disk harrow including a gang of disks in axial alignment, an attachment for leveling the wall of earth dug by the outermost disk of the gang, comprising a supporting member secured to the outer end of the gang, an earth-engaging member spaced axially from said outermost disk in a position to engage said wall of earth, and a radially yieldable flexible member secured to and extending inwardly from said earth engaging member and anchored at its inner end to said supporting member.

3. The invention set forth in claim 2, wherein said flexible member is a coil spring having a generally cylindrical section and said earth-engaging member is a disk having a diameter smaller than that of the disks of the gang.

4. The invention set forth in claim 2, wherein said flexible member comprises a generally cylindrical coil spring anchored at its inner end to said supporting member, and having a disk of relatively small diameter secured to its outer end.

5. A disk harrow including a gang of disks in axial alignment and having an outer end, and means for leveling a wall of earth dug by the outermost disk of said gang, comprising a radially yieldable earth-engaging member secured to said outer end of the gang and adapted to engage said wall of earth, said earth-engaging member including a horizontal length of coil spring of generally cylindrical section which is anchored at its inner end to the outer end of the gang and which is provided at its outer end with a disk-like member engageable with said wall of earth.

6. The invention set forth in claim 5, wherein said coil spring is flared at its outer end to form said disk-like member.

References Cited in the file of this patent
UNITED STATES PATENTS

| | | |
|---|---|---|
| 1,053,976 | Doll | Feb. 25, 1913 |
| 2,253,391 | Ohlendorf | Aug. 19, 1941 |
| 2,324,064 | Coffing | July 13, 1943 |
| 2,452,212 | Shimmon | Oct. 26, 1948 |
| 2,808,771 | Brown | Oct. 8, 1957 |
| 2,818,008 | Fulper et al. | Dec. 31, 1957 |